United States Patent

Manley et al.

Patent Number: 5,589,550
Date of Patent: Dec. 31, 1996

[54] PEROXIDE-CURED POLYACRYLATES

[75] Inventors: Paul E. Manley, Louisville, Ky.; Richard J. Flecksteiner, Crystal Lake, Ill.

[73] Assignee: Zeon Chemicals Incorporated, Louisville, Ky.

[21] Appl. No.: 547,925

[22] Filed: Oct. 25, 1995

[51] Int. Cl.⁶ ............................................. C08F 8/30
[52] U.S. Cl. .................. 525/282; 525/330.5; 525/375
[58] Field of Search ............................................ 525/282

[56] References Cited

FOREIGN PATENT DOCUMENTS 5-214196  8/1993  Japan.

*Primary Examiner*—Bernard Lipman
*Attorney, Agent, or Firm*—Armstrong, Westerman, Hattori, McLeland & Naughton

[57] ABSTRACT

A polyacrylate made from a monomer mixture containing alkyl acrylates and optionally ethylene, propylene, and acrylonitrile, and/or an alkoxyl alkyl or alkythioalkyl acrylate is cured with 1,1-bis(t-butylperoxy)-3,3,5-trimethylcyclohexane and m-phenylenediamine maleimide.

7 Claims, No Drawings

PEROXIDE-CURED POLYACRYLATES

The present invention relates to peroxide-cured polyacrylates, a method for curing polyacrylates and to curable compositions containing polyacrylates.

BACKGROUND OF THE INVENTION

Polyacrylates are elastomeric polymers or copolymers of acrylic acid esters having a saturated main chain with the ester groups constituting side chains on the main chain. Polyacrylates are resistant to ozone and to aging in air at moderately elevated temperatures up to about 200° C., and resist swelling, hardening, and other changes that take place in hot oils, making them particularly useful in various automotive applications.

The earliest commercial polyacrylate, poly(ethyl acrylate)

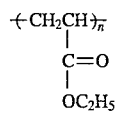

becomes stiff on cooling and brittle at high temperatures. Increased flexibility is achieved by utilizing longer-chain alkyl esters in place of the ethyl ester, but polyacrylates made from longer-chain alkyl esters are less oil resistant. An acceptable balance of oil resistance to flexibility is obtained by copolymerizing ethyl acrylate with n-butyl acrylate. Such copolymers are commercially available.

Vulcanization of elastomers, the crosslinking of polymer chains, decreases thermoplasticity and increases resilience. Polyacrylates may be modified to contain reactive cure sites, which facilitate vulcanization or curing, by including a halogen-containing monomer with the other monomer or monomers being polymerized. For example, when ethyl acrylate is copolymerized with a small amount of 2-chloroethyl vinyl ether, the side chain, with the chlorine atom activated by the ether linkage, provides a convenient crosslinking site.

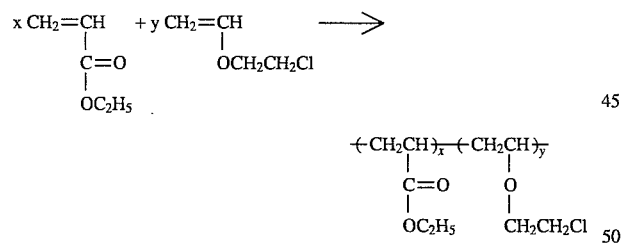

Vulcanization is effected with a variety of polyamine- and sulfur compound-containing curing systems. Copolymers containing 2-chloroethyl acrylate as the halogen-containing monomer are vulcanized or cured with the same types of curing systems as are used with copolymers containing 2-chloroethyl vinyl ether. A much more active curing site is provided by using vinyl chloroacetate or vinyl benzyl chloride as the comonomer.

Using allyl glycidyl ether as a comonomer

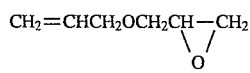

provides a non-halogen cure site. The epoxide groups are crosslinked with systems similar to those used for crosslinking polyacrylates containing α-chloroacetyl units.

Unlike polyacrylates, many elastomers or rubbery polymers contain carbon-carbon unsaturation and are peroxide-curable. Peroxide curing is advantageous in that a good cure is obtained with a minimum of scorch (premature crosslinking during cure), and the cured product, where the polymer chains are crosslinked by carbon-carbon linkages, is generally more stable than a product obtained by vulcanization with nitrogen- or sulfur-containing compounds.

Polyacrylates contain a saturated backbone, and are not considered peroxide curable. A recent Japanese Patent Publication, JP5-214,196, published Aug. 24, 1993, discloses vulcanizing an acrylic rubber containing 30–80% by weight of methoxyethyl acrylate, 20–70% by weight of alkyl acrylate or other alkoxyalkyl acrylate, and 0–30% by weight of other comonomers with a curing system comprising an organic peroxide and a bis-maleimide. It appears that the presence of the ether linkage in the methoxy group activates the polyacrylate making it amenable to vulcanization. However, the presence of the methoxy group may impair thermal stability and other desirable properties of the polyacrylate.

It is, therefore, a primary object of the present invention to provide a method and a composition for preparing a peroxide-cured polyacrylate wherein the polyacrylate has no cure sites or other substituents on the ester groups, and the improved peroxide-cured polyacrylate so obtained.

It is a further object of the invention to provide other thermally stable and scorch-resistant peroxide-cured polyacrylates, which may contain a limited amount of alkoxyalkyl acrylate and/or other structural units.

BRIEF DESCRIPTION OF THE INVENTION

In its method aspect, the present invention is a process for curing a polyacrylate consisting essentially of at least 10 mole % of the structural unit

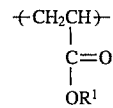

wherein $R^1$ is $C_{4-8}$ alkyl; up to 40 mole % of the structural unit

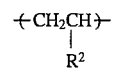

wherein $R^2$ is hydrogen, methyl, ethyl or cyano; up to 30 mole % of the structural unit

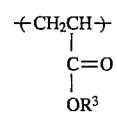

wherein $R^3$ is alkoxyalkyl or alkylthioalkyl containing 2 to 12 carbon atoms; and the balance to a total of 100 mole % of the structural unit

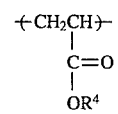

wherein $R^4$ is $C_{1-3}$ alkyl.

The latter polyacrylate may include a small amount, less than 5 mole %, of structural units derived from an ethylenically unsaturated monomer copolymerizable with alkyl acrylates.

DETAILED DESCRIPTION OF THE INVENTION

The polyacrylate elastomers utilized in practicing the method of the present invention are copolymers formed by copolymerizing a mixture containing two alkyl acrylates and containing at least 10 mole % of a $C_{4-8}$ acrylate with n-butyl acrylate being preferred. The other alkyl acrylate monomer may be a $C_{1-3}$ acrylate, such as methyl, ethyl or propyl acrylate, where the alkyl groups may be straight-chain or branched-chain alkyl groups. In addition, the mixture may contain up to 30 mole %, but preferably less than 20 mole %, of ethylene, propylene, 1-butylene or acrylonitrile, with acrylonitrile being preferred.

Acrylate elastomers or rubbers are prepared by emulsion, suspension, solution or bulk polymerization. Emulsion and suspension polymerization are more commonly employed, and polymerization is generally initiated by free-radical generating agents. Methods for making polyacrylates are well known to those skilled in the art and are not part of the present invention.

According to the method of the present invention, a particular polyacrylate is peroxide-cured by heating at 150°–190° C. for several minutes, generally 4–10 minutes, with a curing system comprising di-1,1-bis(t-butylperoxy)-3,3,5-trimethylcyclohexane as the peroxide curing agent and m-phenylediamine as the coagent or promoter. When practicing the method of the present invention, a polyacrylate rubber masterbatch is prepared in the customary manner and admixed with the curing system using conventional equipment, such as blenders, mixers, extruders or the like. The curable or vulcanizable composition, may contain, in addition to the curing system, a conventional lubricant such as stearic acid, a carbon black filler and an antioxidant. Inclusion of the antioxidant generally results in an increase of the tensile strength of the cured product but has the disadvantage of slowing down the rate of curing and increasing compression set. Compression set is an art-recognized measure of the extent of curing and is determined by compressing an article between flat plates for a specified time at the test temperature, after which the compressing force is released and the article allowed to recover for a specified period of time. The amount of unrecovered height, calculated as a percentage, is compression set.

0 to 20 mole % of the structural unit

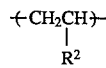

wherein $R^2$ is hydrogen, methyl, ethyl or cyano; and the balance to a total of 100 mole % of the structural unit

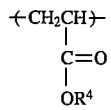

wherein $R^4$ is $C_{1-3}$ alkyl;
which comprises heating the polyacrylate with 1,1-bis(t-butylperoxy)-3,3,5- trimethylcyclohexane and m-phenylenediamine maleimide at a temperature of 150°–222° C.

In one composition aspect, the present invention is the peroxide-cured polyacrylate prepared by the process of the present invention.

In another composition aspect, the present invention is a curable composition consisting of the above-describe polyacrylate and, as the curing system, 1,1-bis (t-butylperoxy)-3,3,5-trimethylcyclohexane and m-phenylenediamine maleimide.

In yet another composition aspect, the present invention is a peroxide-cured polyacrylate consisting essentially of at least 10 mole % of the structural unit

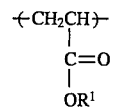

wherein $R^m$ is $C_{4-8}$ alkyl;

The curable compositions of the present invention were prepared by mixing all components, except for the curing system, in a Banbury mixer at room temperature (25° C.). The curing system, 1,1-bis(t-butylperoxy)-3,3,5-trimethylcyclohexane and m-phenylenediamine, and antioxidant when utilized, were added, and the compositions uniformly blended using the Banbury mixer.

Articles made from acrylic elastomers are processed in the same general manner as articles made from other elastomers, and can be shaped by compression, transfer or injection molding, with the latter being preferred. Articles made from conventionally vulcanized or cured polyacrylate parts are usually post-cured after primary curing because of the stringent requirements for articles to be used in automotive applications. As shown by their compression set values, articles made from the peroxide-cured polyacrylates of the present invention do not require post-curing.

Our invention is further illustrated by means of the following non-limiting examples:

EXAMPLES 1–8

The curable compositions shown below were prepared as described above by mixing all components, except for the curing system, in a Banbury mixer at room temperature. The curing system was added and the compositions uniformly blended.

|  | 1 | 2 | 3 | 4 | 5 | 6 | 7 | 8 |
|---|---|---|---|---|---|---|---|---|
| Polyacrylate | 100.0 | 100.0 | 100.0 | 100.0 | 100.0 | 100.0 | 100.0 | 100.0 |
| Carbon black | 60.0 | 60.0 | 60.0 | 60.0 | 60.0 | 60.0 | 60.0 | 60.0 |
| Stearic acid | 3.0 | 3.0 | 3.0 | 3.0 | 3.0 | 3.0 | 3.0 | 3.0 |
| Peroxide | 2.0 | 2.0 | 3.0 | 6.0 | 2.0 | 2.0 | 2.0 | 2.0 |
| Promoter | 2.0 | 2.0 | 2.0 | 2.0 | 4.0 | 6.0 | 3.0 | 4.0 |
| Amine |  | 2.0 |  |  |  |  | 3.0 | 4.0 |
| antioxidant |  |  |  |  |  |  |  |  |
| TOTAL | 167.0 | 169.0 | 168.0 | 171.0 | 169.0 | 171.0 | 171.0 | 173.0 |

The polyacrylate used in these experiments was a polyacrylate made from a monomer mixture containing equimolar amounts of n-butyl acrylate and ethyl acrylate monomer units. The carbon black was a conventional furnace black used in rubber compounding, and the lubricant was stearic acid. The curing system consisted of 1,1-bis(t-butylperoxy)-3,3,5-trimethylcyclohexane as the peroxide and m-phenylenediamine maleimide as the promotor.

Tests on unvulcanized compositions are concerned mainly with their processing properties, such as their response to the forces imposed during mixing, extrusion and curing. The processing properties of the curable compositions of Examples 1–8 were measured using a Mooney Viscometer, large rotor, at 125° C., and a rheometer oscillating disc using a microdie at 10 cpm, 3° arc at 190° C.

|  | 1 | 2 | 3 | 4 | 5 | 6 | 7 | 8 |
|---|---|---|---|---|---|---|---|---|
| Mooney Viscometer |  |  |  |  |  |  |  |  |
| Visc. minimum | 30 | 28 | 31 | 30 | 30 | 31 | 32 | 32 |
| T5, minutes | 26.2 | 30 | 21.5 | 14.4 | 21 | 21 | 14 | 11.4 |
| Rheometer, |  |  |  |  |  |  |  |  |
| ML, lbf*in | 6.5 | 5.5 | 7 | 7.2 | 7.0 | 7.2 | 7.8 | 8.2 |
| ML, N*m | 0.7 | 0.6 | 0.8 | 0.8 | 0.8 | 0.8 | 0.9 | 0.9 |
| MH, lbf*in | 20.0 | 19.0 | 22.0 | 30.0 | 25.9 | 34.0 | 26.3 | 30.6 |
| MH, N*m | 2.2 | 2.1 | 2.4 | 3.3 | 2.9 | 3.8 | 2.9 | 3.4 |
| Ts2, minutes | 1.1 | 1.6 | 1 | 0.8 | 1.0 | 0.9 | 0.9 | 0.8 |
| T'90, minutes | 2.0 | 3.4 | 1.8 | 1.8 | 1.9 | 1.9 | 1.6 | 1.6 |

Properties of the cured compositions, 4 minute cure time at 190° C. with no post-cure, are as follows:

|  | 1 | 2 | 5 | 6 |
|---|---|---|---|---|
| Stress 100%, psi | 265 | 235 | 385 | 475 |
| Stress 100%, MPa | 1.8 | 1.6 | 2.7 | 3.3 |
| Tensile, psi | 697 | 930 | 865.0 | 810.0 |
| Tensile, MPa | 4.8 | 6.4 | 6.0 | 5.6 |
| Elongation, % | 240 | 330 | 240 | 195 |
| Hardness, A pts | 50 | 52 | 57 | 62 |
| Compression Set, Method B 70 hrs @ 150° C. % set | 28 | 37 | 38 | 37 |

Properties of the cured compositions of Examples 1, 2, 5 and 6, 4 minute cure time at 190° C. with post-curing for 4 hours at 177° C. are as follows:

|  | 1 | 2 | 5 | 6 |
|---|---|---|---|---|
| Stress 100%, psi | 280 | 275 | 365 | 815 |
| Stress 100%, MPa | 1.9 | 1.9 | 3.2 | 5.6 |
| Tensile, psi | 760 | 960 | 795.0 | 715.0 |
| Tensile, MPa | 5.2 | 6.6 | 5.5 | 4.9 |
| Elongation, % | 270 | 330 | 200 | 235 |
| Hardness, A pts | 55 | 56 | 60 | 65 |
| Buttons Compression Set, Method B 70 hrs @ 150° C. % set | 28 | 23.5 | 27 | 26 |

The stability of the peroxide-cured polyacrylates of the present invention to oxidation was measured using accelerated aging tests in which dumbbells cut from the material to be tested were exposed to circulating hot air in an oven. Their stability when exposed to hot oil, a particularly important property for articles intended for automotive applications, was also measured. The results of aging the cured compositions are summarized below:

|  | 1 | 2 | 5 | 6 |
|---|---|---|---|---|
| Heating in Air Oven (No Post-Curing) 70 Hours at 150° C. |  |  |  |  |
| Tensile, psi | 775 | 960 | 860 | 885 |
| Tensile, MPa | 5.3 | 6.6 | 5.9 | 6.1 |
| Tensile Change, % | 12 | 3 | −1 | 9 |
| Elongation, % | 240 | 330 | 210 | 190 |
| Elong. Change, % | 0 | 0 | −13 | −3 |
| Hardness A, pt's | 61 | 62 | 65 | 70 |
| Hard Change, pt's | 11 | 10 | 8 | 8 |
| 180°Bend | Pass | Pass | Pass | Pass |
| Heating in Air Oven (Post-Cured) 70 Hours at 150° C. |  |  |  |  |
| Tensile, psi | 730 | 950 | 895 | 810 |
| Tensile, MPa | 5.0 | 6.6 | 6.2 | 5.6 |
| Tensile Change, % | −4 | −1 | 13 | 13 |
| Elongation, % | 225 | 330 | 185 | 220 |
| Elong. Change, % | −17 | 0 | −8 | −6 |
| Hardness A, pt's | 60 | 60 | 66 | 71 |
| Hard Change, pt's | 5 | 4 | 6 | 6 |
| 180°Bend | Pass | Pass | Pass | Pass |
| Soaking in IRM 903 Oil (No Post-Curing) 70 Hours at 150° C. |  |  |  |  |
| Tensile, psi | 420 | 630 | 520 | 450 |
| Tensile, Mpa | 2.9 | 4.3 | 3.6 | 3.1 |
| Tensile Change, % | −40 | −32 | −40 | −44 |
| Elongation, % | 185 | 265 | 190 | 145 |
| Elong. Change, % | −23 | −20 | −21 | −26 |
| Hardness A, pt's | 24 | 25 | 30 | 35 |
| Hard Change, pt's | −26 | −27 | −27 | −27 |
| Volume Change | 42 | 43 | 42 | 43 |
| 180°Bend | Pass | Pass | Pass | Pass |
| Soaking in IRM 903 Oil (Post-Cured) 70 Hours at 150° C. |  |  |  |  |
| Tensile, psi | 455 | 655 | 505 | 525 |
| Tensile, MPa | 3.1 | 4.5 | 3.5 | 3.6 |
| Tensile Change, % | −40 | −32 | −36.5 | −26.5 |
| Elongation, % | 215 | 285 | 180 | 145 |
| Elong. Change, % | −20 | −14 | −10 | −38.3 |
| Hardness A, pt's | 25 | 25 | 29 | 35 |
| Hard Change, pt's | −30 | −31 | −31 | −30 |
| Volume Change, % | 42 | 42 | 43 | 43 |

As indicated above, curing was effected at 170° C. However, similar results were obtained when curing was effected at 180° C. or at 190° C. Post-curing did not significantly improve physical properties, such as tensile strength and compression set, of the peroxide-cured polyacrylates of Examples 1–8.

Using the same experimental procedures described above, the following polyacrylate-containing formulations were prepared and peroxide-cured at 170° C.

|  | 9 | 10 | 11 |
|---|---|---|---|
| Polyacrylate A | 100.0 |  |  |
| Polyacrylate B |  | 100.0 |  |
| Polyacrylate C |  |  | 100.0 |
| Stearic Acid | 3.0 | 3.0 | 3.0 |
| Carbon black | 60.0 | 60.0 | 60.0 |
| Peroxide | 2.0 | 2.0 | 2.0 |
| Promoter | 2.0 | 2.0 | 2.0 |
| Antioxidant | 2.0 | 2.0 | 2.0 |
| TOTAL | 169.0 | 169.0 | 169.0 |

The approximate percentages by weight of the monomers constituting the structural units in polyacrylates A, B and C is as follows:

| Polyacrylate | EA | BA | MEA | ACN |
|---|---|---|---|---|
| A | 55 | 45 | | |
| B | 41 | 36 | 20 | 2 |
| C | 42 | 36 | 20 | 2 |

EA designates ethyl acrylate
BA designates butyl acrylate
MEA designates methoxyethyl acrylate
ACN designates acrylonitrile The processing properties of the curable compositions were measured using a Mooney Viscometer, large rotor, at 100° C., and a rheometer oscillating disc using a microdie at 10 cpm, 3° arc at 190° C.

| | 9 | 11 | 12 |
|---|---|---|---|
| Mooney Viscometer: Visc. minimum | 39 | 42 | 49 |
| Mooney Viscometer: | | | |
| Visc. minimum | 32 | 33 | 41 |
| T5, minutes | 30 | 30 | 30 |
| Rheometer | | | |
| ML, lbf*in | 9.6 | 9.9 | 11.0 |
| ML, N*m | 1.1 | 1.1 | 1.2 |
| MH, lbf*in | 23.4 | 29.3 | 28.0 |
| MH, N*m | 2.6 | 3.3 | 3.1 |
| Ts2, minutes | 1.2 | 1.1 | 1.0 |
| T'90, minutes | 3.1 | 2.5 | 2.5 |
| Cure Rate | 1.9 | 1.4 | 1.5 |

Properties of the cured compositions, 4 minutes cure time at 190° C. with no post-cure, are as follows:

| | 9 | 11 | 12 |
|---|---|---|---|
| Stress 100%, psi | 245 | 355 | 315 |
| Stress 100%, psi | 1.7 | 2.4 | 2.2 |
| Tensile, psi | 1015 | 1125 | 1145 |
| Tensile, MPa | 7.0 | 7.8 | 7.9 |
| Elongation, % | 350 | 275 | 285 |
| Hardness, A pts | 57 | 56 | 60 |
| Tear Die B | | 190 | 205 |
| Tear Die C | | 105 | 105 |
| Compression Set, Method B 70 hrs @ 150° C. % % set | 33 | 45 | 37 |

Stability to oxidation was measured using the accelerated aging tests described above.

| | 9 | 11 | 12 |
|---|---|---|---|
| (No Post-Curing) 70 Hours at 150° C. Environment Air Oven | | | |
| Tensile, psi | 975 | 1125 | 1205 |
| Tensile, Mpa | 6.7 | 7.8 | 8.3 |
| Tensile change, % | −4 | 0 | 5 |
| Elongation, % | 340 | 245 | 275 |
| Elong. Change, % | −3 | −11 | −4 |
| Hardness A, pt's | 65 | 70 | 68 |
| Hard Change, pt's | 8 | 14 | 8 |
| 180°Bend | Pass | Pass | Pass |
| (No Post-Curing) 70 Hours at 190° C. | | | |
| Environment Air Oven | | | |
| Tensile, psi | 805 | 1065 | 1105 |
| Tensile, Mpa | 5.6 | 7.3 | 7.6 |
| Tensile change, % | −21 | −5 | −3 |
| Elongation, % | 320 | 215 | 245 |
| Elong. Change, % | −9 | −22 | −14 |
| Hardness A, pt's | 69 | 74 | 73 |
| Hard Change, pt's | 12 | 18 | 13 |
| 180°Bend | Pass | Pass | Pass |
| (No Post-Curing) 70 Hours at 150° C. Environment IRM 903 Oil | | | |
| Tensile, psi | 665 | 990 | 985 |
| Tensile, Mpa | 4.6 | 6.8 | 6.8 |
| Tensile, change, % | −34 | −12 | −14 |
| Elongation, % | 270 | 240 | 270 |
| Elong. Change % | −23 | −13 | −5 |
| Hardness A, pt's | 24 | 60 | 41 |
| Hard Change, pt's | −33 | 4 | −19 |
| Volume Change, % | 44 | 17 | 17 |
| 180°Bend | Pass | Pass | Pass |

As indicated above, peroxide curing is advantageous because a good cure is obtained with a minimum of premature crosslinking during cure. And the cured product, where polymer chains are crosslinked via carbon-carbon bonds, are generally more stable and heat-resistant that cured products obtained by vulcanization with nitrogen- and/or sulfur-containing vulcanization agents.

Our invention has been described in terms of specific embodiments and non-limiting examples. Various modifications in the method and compositions of the present invention will be apparent to those skilled in the art and are included within the scope of the invention.

What is claimed is:

1. A process for curing a polyacrylate consisting essentially of at least 10 mole % of the structural unit

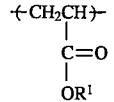

wherein $R^1$ is $C_{4-8}$ alkyl; 0 to 20 mole % the structural unit

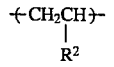

wherein $R^2$ is hydrogen, methyl, ethyl or cyano; and the balance to a total of 100% of the structural unit

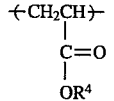

wherein $R^4$ is $C_{1-3}$ alkyl; which comprises heating the polyacrylate with 1,1-bis(t-butylperoxy)-3,3,5-trimethylcyclohexane and m-phenylenediamine maleimide at a temperature in the range of 150°–220° C.

2. A process according to claim 1, wherein $R^1$ is butyl and $R^4$ is ethyl.

3. A process according to claim 1, wherein the polyacrylate consists essentially of equimolar amounts of the structural units

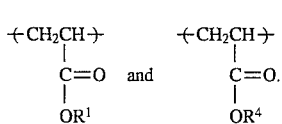

4. The peroxide-cured polyacrylate produced by the process of claims 1, 2 or 3.

5. A curable composition comprising a polyacrylate consisting essentially of at least 10 mole % of the structural unit

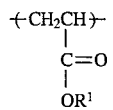

wherein $R^1$ is $C_{4-8}$ alkyl; 0 to 20 mole % of the structural unit

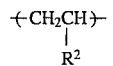

wherein $R^2$ is hydrogen, methyl, ethyl or cyano; and the balance to a total of 100% of the structural unit

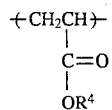

wherein $R^4$ is $C_{1-3}$ alkyl; 1,1-bis(t-butylperoxy)-3,3,5-trimethylcyclohexane and m-phenylenediamine maleimide.

6. A curable composition according to claim 5, wherein $R^1$ is butyl and $R^4$ is ethyl.

7. A curable composition according to claim 5, wherein the polyacrylate consists essentially of equimolar amounts of the structural units

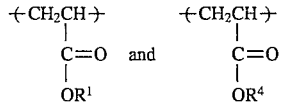

* * * * *